US009240922B2

(12) United States Patent
McGowan

(10) Patent No.: US 9,240,922 B2
(45) Date of Patent: *Jan. 19, 2016

(54) TRANSCODELESS ON-THE-FLY AD INSERTION

(71) Applicant: Brightcove Inc., Boston, MA (US)

(72) Inventor: Albert John McGowan, Phoenix, AZ (US)

(73) Assignee: Brightcove Inc., Boston, MA (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/846,999

(22) Filed: Mar. 19, 2013

(65) Prior Publication Data

US 2013/0254347 A1 Sep. 26, 2013

Related U.S. Application Data

(63) Continuation of application No. 13/092,299, filed on Apr. 22, 2011, now Pat. No. 8,429,250.

(30) Foreign Application Priority Data

Mar. 28, 2011 (AU) ................ 2011201404

(51) Int. Cl.
G06F 15/16 (2006.01)
H04L 29/08 (2006.01)
(Continued)

(52) U.S. Cl.
CPC ...... *H04L 29/08117* (2013.01); *H04L 65/4084* (2013.01); *H04L 65/602* (2013.01); *H04L 67/06* (2013.01); *H04N 21/23424* (2013.01)

(58) Field of Classification Search
CPC .............................................. H04N 21/23424
USPC ........................................................ 709/219
See application file for complete search history.

(56) References Cited

U.S. PATENT DOCUMENTS 5,612,742 A 3/1997 Krause et al.
5,887,243 A 3/1999 Harvey et al.
(Continued)

FOREIGN PATENT DOCUMENTS

AU 2010/202741 B1 12/2010
CN 101282478 A 10/2008
(Continued)

OTHER PUBLICATIONS

Gabin, F. et al. "3GPP Mobile Multimedia Streaming Standards [Standards in a Nutshell]", IEEE Signal Processing Magazine, IEEE Service Center, Piscataway, NJ, US, vol. 27, No. 6, Nov. 1, 2010, pp. 134-138, XPO11317684, ISSN: 1053-5888, p. 135-p. 137.
(Continued)

*Primary Examiner* — Imad Hussain
(74) *Attorney, Agent, or Firm* — Kilpatrick Townsend & Stockton LLP

(57) ABSTRACT

Systems and methods for enabling dynamic advertisement insertion into media files without transcoding are disclosed. The techniques disclosed involve retrieving files of the media and advertisement(s) and converting the files to an MPEG-2 transport stream (MPEG-2 TS) format. The MPEG-2 TS streams are then joined to insert the advertisement at a desired point in the media file. The resulting MPEG-2 TS stream is then converted back to a media file, which can be provided for downloading, or optionally reindexed. Because it does not require transcoding, this process can be performed on-the-fly to provide dynamic insertion of advertisements into media files. Other media file manipulation, including the insertion of non-advertisement media, is contemplated.

20 Claims, 12 Drawing Sheets

(51) Int. Cl.
*H04N 21/234* (2011.01)
*H04L 29/06* (2006.01)

(56) References Cited

U.S. PATENT DOCUMENTS

| | | | |
|---|---|---|---|
| 6,370,199 B1 | 4/2002 | Bock et al. | |
| 6,505,169 B1 * | 1/2003 | Bhagavath | G06Q 30/02 705/14.66 |
| 6,678,332 B1 * | 1/2004 | Gardere | H04N 21/23424 348/705 |
| 6,792,047 B1 * | 9/2004 | Bixby | H04N 21/23424 375/240.26 |
| 6,912,315 B1 | 6/2005 | Wong et al. | |
| 7,096,481 B1 * | 8/2006 | Forecast | H04N 21/23406 348/E5.008 |
| 7,116,894 B1 * | 10/2006 | Chatterton | H04N 5/765 348/512 |
| 7,788,581 B1 | 8/2010 | Bauermeister | |
| 7,827,298 B2 | 11/2010 | Black et al. | |
| 7,877,511 B1 | 1/2011 | Berger et al. | |
| 7,925,549 B2 | 4/2011 | Looney et al. | |
| 7,925,849 B2 | 4/2011 | Izumi | |
| 7,958,007 B2 | 6/2011 | Urbanski et al. | |
| 7,992,165 B1 * | 8/2011 | Ludewig | H04N 21/23424 725/135 |
| 7,996,566 B1 | 8/2011 | Sylvain et al. | |
| 8,027,787 B2 | 9/2011 | Odinak et al. | |
| 8,027,876 B2 | 9/2011 | Taylor | |
| 8,099,473 B2 | 1/2012 | Biderman et al. | |
| 8,145,782 B2 | 3/2012 | McGowan et al. | |
| 8,165,343 B1 | 4/2012 | McGowan | |
| 8,218,651 B1 * | 7/2012 | Eshet | H04N 21/23424 348/515 |
| 8,239,546 B1 | 8/2012 | McGowan | |
| 8,250,617 B2 * | 8/2012 | Hensgen | H04N 21/235 709/219 |
| 8,301,733 B2 | 10/2012 | McGowan | |
| 8,386,630 B1 | 2/2013 | Atzmon | |
| 8,862,754 B2 | 10/2014 | McGowan | |
| 8,954,540 B2 | 2/2015 | McGowan et al. | |
| 2001/0029525 A1 | 10/2001 | Lahr | |
| 2002/0029282 A1 | 3/2002 | Buddhikot et al. | |
| 2002/0046404 A1 | 4/2002 | Mizutani | |
| 2002/0073084 A1 * | 6/2002 | Kauffman | G06Q 30/02 |
| 2002/0104096 A1 | 8/2002 | Cramer et al. | |
| 2002/0122430 A1 | 9/2002 | Haberman et al. | |
| 2002/0144262 A1 * | 10/2002 | Plotnick | G11B 27/005 725/32 |
| 2002/0150239 A1 | 10/2002 | Carny et al. | |
| 2003/0004804 A1 | 1/2003 | Landsman et al. | |
| 2003/0135861 A1 | 7/2003 | Sinz et al. | |
| 2003/0229900 A1 | 12/2003 | Reisman | |
| 2004/0022391 A1 | 2/2004 | O'Brien | |
| 2004/0268384 A1 * | 12/2004 | Stone | G11B 27/005 725/32 |
| 2005/0060229 A1 * | 3/2005 | Riedl | G06Q 30/02 705/14.61 |
| 2005/0076368 A1 * | 4/2005 | Lee | H04N 5/44508 725/58 |
| 2005/0163229 A1 * | 7/2005 | Okada | G11B 27/034 375/240.28 |
| 2005/0193205 A1 | 9/2005 | Jacobs et al. | |
| 2005/0207569 A1 * | 9/2005 | Zhang | H04L 29/06 380/28 |
| 2006/0015637 A1 | 1/2006 | Chung | |
| 2006/0075449 A1 * | 4/2006 | Jagadeesan | G06Q 30/02 725/113 |
| 2006/0114985 A1 | 6/2006 | Linzer | |
| 2006/0122882 A1 | 6/2006 | Brown et al. | |
| 2006/0129907 A1 | 6/2006 | Volk et al. | |
| 2006/0184410 A1 | 8/2006 | Ramamurthy et al. | |
| 2006/0288112 A1 | 12/2006 | Soelberg et al. | |
| 2007/0053513 A1 | 3/2007 | Hoffberg | |
| 2007/0078712 A1 * | 4/2007 | Ott | G06Q 30/02 705/14.69 |
| 2007/0094082 A1 * | 4/2007 | Yruski | G06Q 30/02 705/14.56 |
| 2007/0162571 A1 * | 7/2007 | Gupta | G06Q 30/0242 709/219 |
| 2007/0168542 A1 | 7/2007 | Gupta et al. | |
| 2007/0198416 A1 | 8/2007 | Ye | |
| 2007/0204310 A1 * | 8/2007 | Hua | H04N 7/17318 725/88 |
| 2007/0233891 A1 | 10/2007 | Luby et al. | |
| 2007/0255618 A1 * | 11/2007 | Meerbergen | G06Q 30/02 705/14.46 |
| 2007/0294100 A1 * | 12/2007 | Chen | G06F 17/227 705/1.1 |
| 2007/0299870 A1 * | 12/2007 | Finch | G06Q 30/02 |
| 2008/0005349 A1 | 1/2008 | Li et al. | |
| 2008/0059310 A1 | 3/2008 | Lettow et al. | |
| 2008/0141027 A1 | 6/2008 | Kim et al. | |
| 2008/0195761 A1 * | 8/2008 | Jabri | H04L 65/605 709/250 |
| 2008/0207182 A1 * | 8/2008 | Maharajh | G06F 17/30035 455/414.1 |
| 2008/0215620 A1 * | 9/2008 | Folgner | G06Q 10/10 |
| 2009/0003432 A1 * | 1/2009 | Liu | H04N 21/23406 375/240.01 |
| 2009/0022172 A1 | 1/2009 | Haberman et al. | |
| 2009/0031424 A1 | 1/2009 | Ganesan et al. | |
| 2009/0063280 A1 * | 3/2009 | Wurster | G06Q 30/02 705/14.73 |
| 2009/0089846 A1 | 4/2009 | Wang et al. | |
| 2009/0094634 A1 * | 4/2009 | Haberman | G06Q 30/0251 725/32 |
| 2009/0150941 A1 * | 6/2009 | Riedl | H04N 7/173 725/61 |
| 2009/0172197 A1 | 7/2009 | Kalaboukis et al. | |
| 2009/0182593 A1 | 7/2009 | Whitmore | |
| 2009/0216790 A1 | 8/2009 | Dexter | |
| 2009/0217316 A1 | 8/2009 | Gupta | |
| 2009/0254572 A1 | 10/2009 | Redlich et al. | |
| 2009/0257435 A1 | 10/2009 | Karlsson et al. | |
| 2009/0259941 A1 * | 10/2009 | Kennedy, Jr. | G06F 17/3079 715/719 |
| 2009/0282077 A1 * | 11/2009 | Thomas | G06F 17/30038 |
| 2009/0287841 A1 | 11/2009 | Chapweske et al. | |
| 2009/0296827 A1 | 12/2009 | Karaoguz et al. | |
| 2009/0300145 A1 | 12/2009 | Musayev et al. | |
| 2009/0320063 A1 * | 12/2009 | Barrett | H04N 21/23418 725/34 |
| 2009/0327896 A1 | 12/2009 | Pall et al. | |
| 2010/0057926 A1 | 3/2010 | Cao et al. | |
| 2010/0070996 A1 * | 3/2010 | Liao | G06Q 30/02 725/35 |
| 2010/0095121 A1 | 4/2010 | Shetty et al. | |
| 2010/0100742 A1 | 4/2010 | Courington et al. | |
| 2010/0107200 A1 * | 4/2010 | Drang | H04N 21/2181 725/93 |
| 2010/0114943 A1 | 5/2010 | Fu et al. | |
| 2010/0118973 A1 | 5/2010 | Rodriguez et al. | |
| 2010/0122286 A1 * | 5/2010 | Begeja | G06Q 30/02 725/34 |
| 2010/0129057 A1 | 5/2010 | Kulkarni | |
| 2010/0138892 A1 | 6/2010 | Meuninck et al. | |
| 2010/0161425 A1 | 6/2010 | Sideman | |
| 2010/0189131 A1 * | 7/2010 | Branam | H04N 21/23424 370/474 |
| 2010/0205049 A1 | 8/2010 | Long et al. | |
| 2010/0235438 A1 | 9/2010 | Narayanan et al. | |
| 2011/0029999 A1 | 2/2011 | Foti | |
| 2011/0058792 A1 * | 3/2011 | Towner | G11B 27/00 386/326 |
| 2011/0066703 A1 * | 3/2011 | Kaplan | H04L 65/4084 709/219 |
| 2011/0071911 A1 | 3/2011 | Tung et al. | |
| 2011/0082924 A1 | 4/2011 | Gopalakrishnan | |
| 2011/0161181 A1 | 6/2011 | Esteve Asensio et al. | |
| 2011/0197219 A1 * | 8/2011 | Ross | H04N 7/16 725/31 |
| 2011/0231660 A1 | 9/2011 | Kanungo | |
| 2011/0238507 A1 * | 9/2011 | Ben-Rubi | G06Q 30/0277 705/14.73 |

(56) References Cited

U.S. PATENT DOCUMENTS

| | | | |
|---|---|---|---|
| 2011/0246603 A1 | 10/2011 | Lee | |
| 2011/0246659 A1 | 10/2011 | Bouazizi | |
| 2011/0264506 A1 | 10/2011 | Grant et al. | |
| 2011/0287748 A1 | 11/2011 | Angel et al. | |
| 2012/0005312 A1 | 1/2012 | McGowan et al. | |
| 2012/0005313 A1 | 1/2012 | McGowan et al. | |
| 2012/0023253 A1 | 1/2012 | Rhyu et al. | |
| 2012/0047542 A1* | 2/2012 | Lewis | H04N 21/44016 725/97 |
| 2012/0134355 A1 | 5/2012 | Vendrow et al. | |
| 2012/0137015 A1* | 5/2012 | Sun | H04N 21/26258 709/231 |
| 2012/0167132 A1 | 6/2012 | Mathews et al. | |
| 2012/0179788 A1 | 7/2012 | McGowan | |
| 2012/0185530 A1 | 7/2012 | Reza | |
| 2012/0185608 A1 | 7/2012 | McGowan et al. | |
| 2012/0197419 A1* | 8/2012 | Dhruv | H04N 21/6543 700/94 |
| 2012/0198492 A1* | 8/2012 | Dhruv | H04N 21/23424 725/32 |
| 2012/0224592 A1* | 9/2012 | Henry | H04N 21/234237 370/474 |
| 2012/0233345 A1 | 9/2012 | Hannuksela | |
| 2012/0265892 A1* | 10/2012 | Ma | H04N 21/23418 709/231 |
| 2012/0272262 A1* | 10/2012 | Alexander | H04N 21/25866 725/32 |
| 2013/0007799 A1* | 1/2013 | Sandoval | H04N 21/237 725/32 |
| 2013/0254346 A1 | 9/2013 | McGowan | |
| 2014/0351383 A1* | 11/2014 | Wan | H04L 65/4084 709/219 |

FOREIGN PATENT DOCUMENTS

| | | | |
|---|---|---|---|
| GB | 2462732 | A | 2/2010 |
| GB | 2514027 | A | 11/2014 |
| GB | 2514519 | A | 11/2014 |
| GB | 2515683 | | 12/2014 |
| WO | 2010/025686 | A1 | 3/2010 |
| WO | 2011/009205 | A1 | 1/2011 |
| WO | 2011/039617 | A1 | 4/2011 |
| WO | 2012/175145 | A1 | 12/2012 |
| WO | 2013/101814 | A1 | 7/2013 |
| WO | 2013/101841 | A1 | 7/2013 |
| WO | 2013/148003 | A1 | 10/2013 |

OTHER PUBLICATIONS

Prangl, M. et al. "Towards QoS Improvements of TCP-Based Media Delivery," Networking and Services, 2008, ICNS 2008: Fourth International Conference on IEEE, Piscataway, NJ, USA, Mar. 16, 2008, 6 pages.
International Search Report and Written Opinion of PCT/US2012/071669, mailed on Apr. 5, 2013, 74 pages.
International Search Report and Written Opinion of PCT/US2012/071629, mailed on Apr. 5, 2013, 92 pages.
International Search Report and Written Opinion of PCT/US2013/025180, mailed on Jun. 5, 2013, 105 pages.
International Search Report and Written Opinion of PCT/US2013/023181, mailed on May 8, 2013, 91 pages.
International Search Report and Written Opinion of PCT/US2014/017945, mailed May 14, 2014, , 90 pages.
International Preliminary Report on Patentability for PCT/US2012/071629, mailed Jul. 10, 2014, 8 pages.
International Preliminary Report on Patentability for PCT/US2012/071669, mailed Jul. 10, 2014, 7 pages.
U.S. Appl. No. 12/976,883, filed Dec. 22, 2010 Final Office Action mailed on Dec. 20, 2011, 11 pages.
U.S. Appl. No. 12/976,883, filed Dec. 22, 2010 Non-Final Office Action mailed on Jul. 7, 2011, 11 pages.
U.S. Appl. No. 12/976,890, filed Dec. 22, 2010 Final Office Action mailed Apr. 30, 2012, 34 pages.
U.S. Appl. No. 12/976,890, filed Dec. 22, 2010 Non-Final Office Action mailed Jan. 18, 2012, 31 pages.
U.S. Appl. No. 12/976,890, filed Dec. 22, 2010 Final Office Action mailed Nov. 10, 2011, 30 pages.
U.S. Appl. No. 12/976,890, filed Dec. 22, 2010 Non-Final Office Action mailed Jul. 15, 2011, 43 pages.
U.S. Appl. No. 13/245,324, filed Sep. 26, 2011 Non-Final Rejection mailed Dec. 22, 2011, 16 pages.
U.S. Appl. No. 13/245,372, filed Sep. 26, 2011, Final Office Action mailed on Aug. 21, 2013 , 18 pages.
U.S. Appl. No. 13/245,372, filed Sep. 26, 2011 Non-Final Office Action mailed on Feb. 5, 2013 , 15 pages.
U.S. Appl. No. 13/245,372, filed Sep. 26, 2011 Non-Final Office Action mailed on Sep. 5, 2012 , 11 pages.
U.S. Appl. No. 13/245,372, filed Sep. 26, 2011 Non-Final Office Action mailed on Jan. 26, 2012, 13 pages.
U.S. Appl. No. 13/245,465, filed Sep. 26, 2011 Final Office Action mailed Apr. 8, 2013, 10 pages.
U.S. Appl. No. 13/245,465, filed Sep. 26, 2011 Non-Final Office Action mailed Sep. 20, 2012, 12 pages.
U.S. Appl. No. 13/245,465, filed Sep. 26, 2011 Final Office Action mailed May 17, 2012, 14 pages.
U.S. Appl. No. 13/245,465, filed Sep. 26, 2011 Non-Final Office Action mailed Dec. 22, 2011, 18 pages.
U.S. Appl. No. 13/247,109, filed Sep. 28, 2011 Non-Final Office Action mailed Dec. 15, 2011, 10 pages.
U.S. Appl. No. 13/339,680, filed Dec. 29, 2011 Non-Final Office Action mailed on Jul. 10, 2014, 22 pages.
U.S. Appl. No. 13/339,680, filed Dec. 29, 2011 Final Office Action mailed on Oct. 15, 2013, 13 pages.
U.S. Appl. No. 13/339,680, filed Dec. 29, 2011 Final Office Action mailed on May 30, 2013, 12 pages.
U.S. Appl. No. 13/339,680, filed Dec. 29, 2011 Non-Final Office Action mailed on Jul. 25, 2012, 10 pages.
U.S. Appl. No. 13/339,680, filed Dec. 29, 2011 Non-Final Office Action mailed on Mar. 7, 2012, 14 pages.
U.S. Appl. No. 13/339,668, filed Dec. 29, 2011 Final Office Action mailed Feb. 1, 2013, 18 pages.
U.S. Appl. No. 13/339,668, filed Dec. 29, 2011 Non- Final Office Action mailed Jul. 27, 2012, 12 pages.
U.S. Appl. No. 13/339,668, filed Dec. 29, 2011 Non-Final Office Action mailed Mar. 9, 2012, 15 pages.
U.S. Appl. No. 13/429,656, filed Mar. 26, 2012 Non-Final Office Action mailed Jul. 2, 2012, 6 pages.
U.S. Appl. No. 13/543,045, filed Jul. 6, 2012 Non-Final Office Action mailed May 23, 2013, 8 pages.
U.S. Appl. No. 13/567,681, filed Aug. 6, 2012 Non-Final Office Action mailed Dec. 11, 2013, 14 pages.
U.S. Appl. No. 13/624,029, filed Sep. 21, 2012 Non-Final Office Action mailed Feb. 5, 2013, 10 pages.
U.S. Appl. No. 13/339,680, filed Dec. 29, 2011, Non-Final Office Action mailed on Mar. 12, 2015, 36 pages.
International Preliminary Report on Patentability for PCT/US2013/023181, mailed Oct. 9, 2014, 6 pages.
U.S. Appl. No. 13/567,681, filed Aug. 6, 2012, Notice of Allowance mailed Jun. 2, 2014, 22 pages.
U.S. Appl. No. 13/567,681, filed Aug. 6, 2012, Notice of Allowance mailed Oct. 9, 2014, 14 pages.
International Search Report and Written Opinion for PCT/US2012/071629, mailed May 4, 2013, 11 pages.
Australian Patent Office, Examiner's First Report on Patent Application No. 2010202740 for Unicorn Media, Inc., dated Aug. 10, 2010, 3 pages.
Australian Patent Office, Examiner's First Report on Patent Application No. 2010202741 for Unicorn Media, Inc., dated Aug. 9, 2010, 4 pages.
Ben Atallah, S., et al., "Dynamic Configuration of Multimedia Applications, " IFIP International Federation for Information Processing, 2003, 18 pages.
U.S. Appl. No. 13/092,299, filed Apr. 22, 2011, Final Office Action mailed Sep. 7, 2012, 13 pages.
U.S. Appl. No. 13/092,299, filed Apr. 22, 2011, Non-Final Office Action mailed May 24, 2012, 15 pages.

(56) References Cited

OTHER PUBLICATIONS

International Preliminary Report on Patentability for PCT/US2013/025180 mailed Oct. 9, 2014, 9 pages.
U.S. Appl. No. 13/791,789, filed Mar. 8, 2013, Non-Final Office Action mailed Feb. 5, 2015, 43 pages.
U.S. Appl. No. 13/339,668, filed Dec. 29, 2011, Non-Final Office Action mailed Feb. 13, 2015, 28 pages.
U.S. Appl. No. 13/791,789, filed Mar. 8, 2013, Final Office Action mailed Jun. 18, 2015, 24 pages.
U.S. Appl. No. 13/245,372, filed Sep. 26, 2011, Non-Final Office Action mailed on Jun. 4, 2015, 37 pages.

* cited by examiner

TRANSCODELESS ON-THE-FLY AD INSERTION

CROSS-REFERENCE TO RELATED APPLICATION

This application claims priority to and is a continuation of U.S. patent application Ser. No. 13/092,299, filed Apr. 22, 2011, entitled "TRANSCODELESS ON-THE-FLY AD INSERTION, which claims priority to Australian Patent Application Serial No. 2011201404, filed Mar. 28, 2011, entitled "TRANSCODELESS ON-THE-FLY AD INSERTION," which are incorporated herein by reference for all purposes.

BACKGROUND

The delivery of media over networks such as the Internet can be accomplished in many ways, including progressive downloading or streaming. Progressive downloading involves downloading a media file from the network to a device running software client. Unlike many other types of downloading, however, progressive downloading enables the device to initiate playback of the media before the media file is completely downloaded.

Progressive downloading, however, has various limitations. For example, inserting advertisements into a media file for progressive downloading often requires transcoding, which can take a large amount of time and processing power. Additionally, if several different advertisements are to be used, or if the advertisements change, a large amount of preprocessing is required to create and store various different permutations of a media file so that the proper permutation is ready to be downloaded once requested. This can consume vast amounts of processing power and storage space. Furthermore, it restricts the customization of advertisements to a particular end user by requiring that the downloaded file is selected from a finite set of preprocessed permutations.

BRIEF SUMMARY

Systems and methods for enabling dynamic advertisement insertion into media files without transcoding are disclosed. The techniques disclosed involve retrieving files of the media and advertisement(s) and converting the files to an MPEG-2 transport stream (MPEG-2 TS) format. The MPEG-2 TS streams are then joined to insert the advertisement at a desired point in the media file. The resulting MPEG-2 TS stream is then converted back to a media file, which can be provided for downloading, or optionally reindexed. Because it does not require transcoding, this process can be performed on-the-fly to provide dynamic insertion of advertisements into media files. Other media file manipulation, including the insertion of non-advertisement media, is contemplated also.

An example of a method for providing media with a data network according to the disclosure includes receiving a media file request and retrieving a first media file. The first media file can comprise media content for playback over a period of time, and the media file can have a certain file format. The method further can include associating the first media file with a first set of metadata to create a first MPEG-2 transport stream, and retrieving a second media file having the certain file format. The method also can include associating the second media file with a second set of metadata to create to a second MPEG-2 transport stream, and joining the first MPEG-2 transport stream and the second MPEG-2 transport stream to create a third MPEG-2 transport stream. The third MPEG-2 transport stream can have a third set of metadata. Finally, the method can include removing at least a portion of the third set of metadata from the third MPEG-2 transport stream to create a third media file in the certain file format, and providing the third media file.

Implementations of such a method can include one or more of the following features. The first MPEG-2 transport stream can be split into two portions, where each of the two portions of the first MPEG-2 transport stream corresponds to a separate portion of the first media file. The joining the first MPEG-2 transport stream and the second MPEG-2 transport stream can comprise inserting the second MPEG-2 transport stream between the two portions of the first MPEG-2 transport stream. The second MPEG-2 transport stream can be inserted between the two portions of the first MPEG-2 transport stream can comprise concatenating the second MPEG-2 transport stream to the end of a first portion of the first MPEG-2 transport stream to form an intermediate MPEG-2 transport stream, and concatenating a second portion of the first MPEG-2 transport stream the end of the intermediate MPEG-2 transport stream. The third media file can be reindexed. The certain file format can comprise an audio compression format, a video compression format, or both. Providing the third media file can comprise delivering the third media file as a progressive download or as a media stream.

Implementations of such a method further can include one or more of the following features. The media file request can be received from a Content Delivery Network (CDN). The third media file can be provided to the CDN. Insertion data can be received, wherein the joining is based, at least in part, on the insertion data. The insertion data can include data indicative of an identity of the second media file. The insertion data can include data indicative of an insertion point of the first media file at which content corresponding to the second media file is to be inserted. A Universal Resource Indicator (URI) of the requested media file can be provided. The certain file format can include at least one format from the group consisting of MPEG-2 Audio Layer 3 (MP3), Third Generation Partnership Project (3GP), and MPEG-4 (MP4).

An example of a system for communicating media over a network, according to the disclosure, includes a data storage configured to store a first media file, having content for playback over a period of time, in a certain file format. The system also can include a processing server having a network interface and being communicatively coupled with the data storage. The processing server can be configured to receive, using the network interface, a media file request, and retrieve the first media file from the data storage. The processing server also can be configured to associate the first media file with a first set of metadata to create a first MPEG-2 transport stream, retrieve a second media file, and associate the second file with a second set of metadata to create a second MPEG-2 transport stream. The processing server further can be configured to join the first MPEG-2 transport stream and the second MPEG-2 transport stream to create a third MPEG-2 transport stream, the third MPEG-2 transport stream having a third set of metadata, and remove at least a portion of the third set of metadata from the third MPEG-2 transport stream to create a third media file in the certain file format. Finally, the processing server can be configured to provide, using the network interface, the third media file.

Implementations of such a system can include one or more of the following features. The processing server further can be configured to split the first MPEG-2 transport stream into two portions such that each of the two portions of the first MPEG-2 transport stream corresponds to a separate portion of the first media file, and join the first MPEG-2 transport stream and the second MPEG-2 transport stream by inserting the second MPEG-2 transport stream between the two portions of the first MPEG-2 transport stream. The processing server can be configured to retrieve, using the network interface, the second media file from a source other than the data storage. The processing server further can be configured to reindex the third media file. A media caching server having a memory and being communicatively coupled with the processing server can be configured to send the media file request, using a network, to the processing server, receive the third media file, using the network, from the processing server, and store the third media file in the memory. The media caching server further can be configured to provide the third media file to a device communicatively coupled with the media caching server. The media file request can comprise a first media file request for the third media file, and the media caching server will not send a second media file request for the third media file to the processing server if the media caching server has the third media file stored in the memory.

Implementations of such a system further can include one or more of the following features. The processing server further can be configured to provide the third media file to a Content Delivery Network (CDN). The processing server further can be configured to receive insertion data, and join the first MPEG-2 transport stream and the second MPEG-2 transport stream based, at least in part, on the insertion data. The processing server further can be configured to determine, based on the insertion data, a point of the first media file at which content corresponding to the second media file is to be inserted. Joining the first MPEG-2 transport stream and the second MPEG-2 transport stream can include performing at least one action from the group of actions consisting of concatenating the second MPEG-2 transport stream to the end of the first MPEG-2 transport stream, concatenating the first MPEG-2 transport stream to the end of the second MPEG-2 transport stream, inserting the first MPEG-2 transport stream into the second MPEG-2 transport stream, and inserting the second MPEG-2 transport stream into the first MPEG-2 transport stream. The processing server further can be configured to provide a Universal Resource Indicator (URI) of the requested media file.

An example of a non-transitory, machine-readable storage medium for communicating a requested media file over a network, according to the disclosure, has a plurality of instructions embedded thereon, which, when executed by one or more machines, cause the one or more machines to receive, using a network interface, instructions for manipulating a first media file to create the requested media file. The requested media file includes content for playback over a period of time. The instructions, when executed by one or more machines, further can cause the one or more machines to retrieve the first media file, the first media file having a certain file format, associate the first media file with a first set of metadata to create a first MPEG-2 transport stream, and manipulate the first MPEG-2 transport stream, using the instructions for manipulating the first media file, to create a manipulated MPEG-2 transport stream. The instructions, when executed by one or more machines, further can cause the one or more machines to create the requested media file, where creating the requested media file includes removing at least a portion of metadata of the manipulated MPEG-2 transport stream, and the requested media file has the certain file format. Finally, the instructions, when executed by one or more machines, can cause the one or more machines to provide, using the network interface, the requested media file.

Implementations of such a non-transitory, machine-readable storage medium can cause the one or more machines to perform one or more of the following functions and/or exhibit one or more of the following features. A second media file having the certain file format can be retrieved, and the second media file can be associated with a second set of metadata to create a second MPEG-2 transport stream. Manipulating the first MPEG-2 transport stream can include joining the first MPEG-2 transport stream and the second MPEG-2 transport stream to create the manipulated MPEG-2 transport stream. Manipulating the first MPEG-2 transport stream can include splitting the first MPEG-2 transport stream into two portions such that each of the two portions of the first MPEG-2 transport stream corresponds to a separate portion of the first media file, and inserting the second MPEG-2 transport stream between the two portions of the first MPEG-2 transport stream such that. The instructions for manipulating a first media file can include information indicative of an identity of the second media file. The instructions for manipulating a first media file can include information indicative of a point at which the first MPEG-2 transport stream is to be split.

Implementations of such a non-transitory, machine-readable storage medium further can cause the one or more machines to perform one or more of the following functions and/or exhibit one or more of the following features. Manipulating the first MPEG-2 transport stream can include splitting the first MPEG-2 transport stream into at least two portions such that each of the at least two portions of the first MPEG-2 transport stream corresponds to a separate portion of the first media file, and removing a portion such that the manipulated MPEG-2 transport stream does not include the removed portion of the first MPEG-2 transport stream. One or more machines can reindex the requested media file. A Universal Resource Indicator (URI) of the requested media file can be provided.

BRIEF DESCRIPTION OF THE DRAWINGS

The present disclosure is described in conjunction with the appended figures.

DETAILED DESCRIPTION OF THE INVENTION

Figure 1:
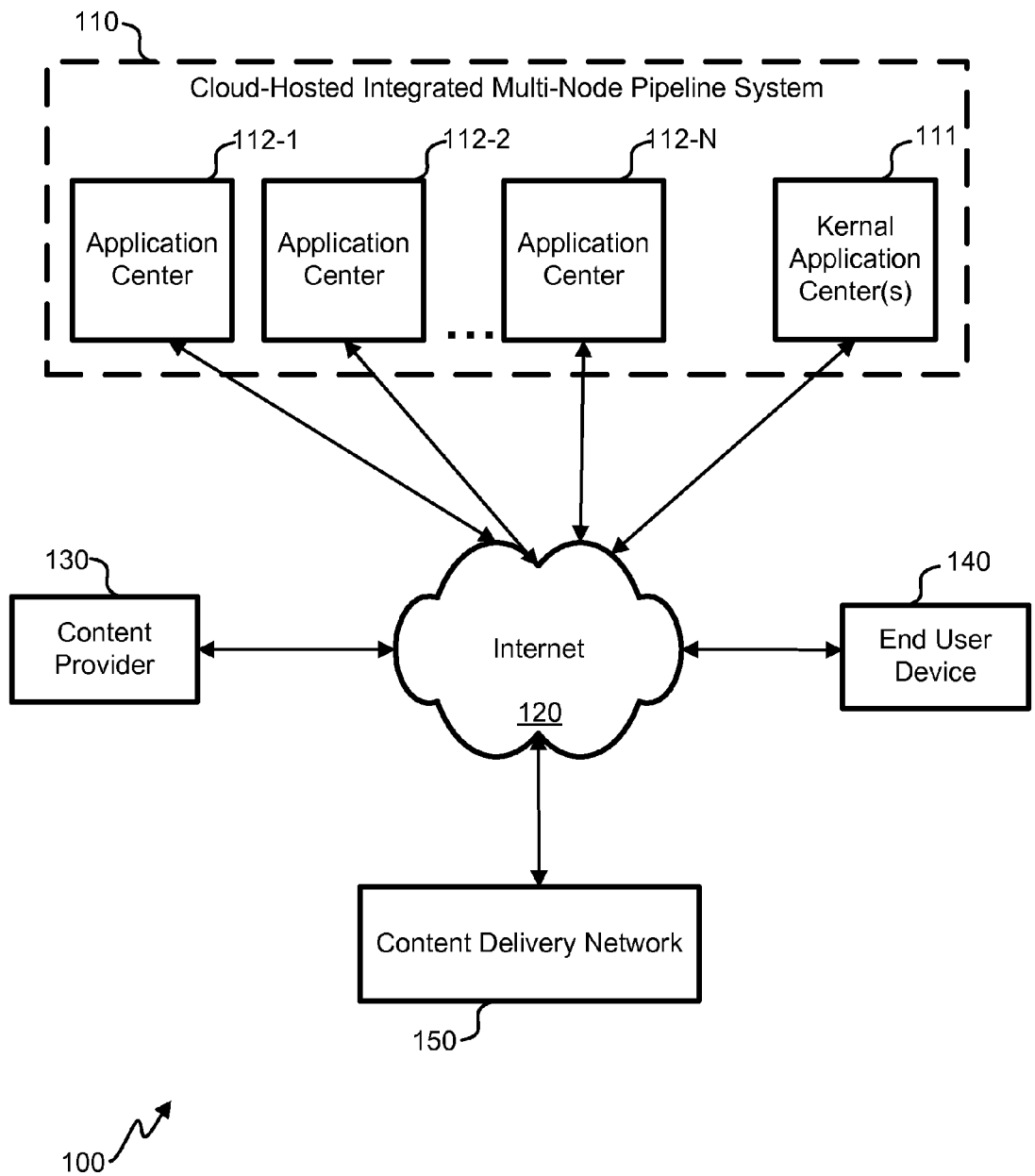
FIG. 1 is a block diagram of an embodiment of a media servicing system.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing a preferred exemplary embodiment. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Contiguous streaming and progressive downloading of media have become widely-used methods of media distribution, but unlike file "chunking" for example, they typically require the media to be stored as a single, contiguous file. This can enable a media player client (e.g., a "single-link player") to receive and play the media by using one link. ("Playlist players," on the other hand, can use different links to play different portions of a media program—following multiple links to play and entire program.) The requirement to store media as a single, contiguous file can limit a content provider's ability to dynamically insert additional media, such as advertisements, during playback. Other manipulations, such as deleting or moving a portion of a media file, are similarly restricted. As discussed herein, however, certain systems and methods can be utilized enable dynamic advertisement insertion into media files, as well as other media file manipulation.

A traditional approach to preprocessing media for contiguous streaming and/or progressive downloading involves transcoding and storing media files. Because transcoding is particularly processing intensive, a content distribution system will typically transcode and store all permutations of an original or primary media file beforehand (i.e., before the media file is requested). The term "permutation," as used herein, is a media file having different combination of features, such as bitrate, caption, language, etc. Each permutation of a media file is stored as a separate file.

The use of advertisements can exacerbate the processing and storage requirements. If more than one set of advertisements is to be played before, during, and/or after the media file, a new permutation must be made for each set of advertisements, effectively multiplying the required number of files to be stored on the system. For example, in addition to the permutations described above, additional permutations may be needed for each set of advertisements.

Traditional media file manipulation, such as inserting advertisements into a media file, typically requires additional transcoding. Attempts to manipulate media files without transcoding often can result in corruption of the file, making the resulting file unplayable. However, the associated processing and storage requirements to transcode and store different permutations of media files can be burdensome to any system. On current systems implementing this traditional approach, updating the permutations with new advertisements can take several days. The systems and methods disclosed herein take advantage of features that enable manipulation of media files without the need for additional transcoding, alleviating processing and storage requirements and enabling dynamic advertisement insertion.

Media files typically comprise a program stream format. "Program stream," as used herein, is a container format that can multiplex digital audio, video, and more. Although manipulating media files in program stream format can result in corrupting the media files (as stated above), the media files can be manipulated once they are formatted in a transport stream, which is a format used for the transmission and storage of media and other data used in broadcast systems. "Wrapping" the program stream is a quick and simple process involving associating the media file with metadata to create a new file in a transport stream format. For example, as discussed in further detail below, primary and secondary media files in an MPEG-4 (MP4) program stream format can be wrapped so that each forms an MPEG-2 transport stream (MPEG-2 TS, which is specified in MPEG-2 Part 1 and also known as MPEG or simply TS). Once in the MPEG-2 TS format, the files can be manipulated in various ways by performing binary splits and/or concatenations. After the manipulations are complete, the completed file (which is in MPEG-2 TS format) is then converted back into an MP4, which can be provided to and/or played back by a client. Because the process described above can be performed on the order of one second or less (which is far less time than performing file manipulations by transcoding), it can be performed on the fly (i.e., in real time) when the media is requested, without the need for preprocessing. Depending on desired functionality, processing power, file types and/or sizes, etc., other embodiments can take different amounts of time to perform this process, such as less than 0.5, 0.33, or 0.25 seconds or less than 2, 3, 4, 5, 10, or 20 seconds. This functionality can enable media providers to insert advertisements and/or perform other file manipulations dynamically, reducing processing and storage requirements. [0036] While the above features may be implemented in a variety of different systems, some embodiments may be implemented as part of a larger media service system described in FIGS. 1-4.

FIG. 1 is a block diagram illustrating a media servicing system 100, according to some embodiments of the present invention. The system 100, which is a type of data network, may deliver media content to the end user device 140 through a network such as the Internet 120. The end user device 140 can be one of any number of devices configured to receive media over the Internet 120, such as a mobile phone, tablet computer, personal computer, portable media device, etc. A media file provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media file.

The media servicing system further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide the end user device 140 with a more desirable playback experience.

End user device 140 can request a media file to stream with a client program executed by the end user device 140. The client program can be, for example, a media player, browser, or other application adapted to request and/or play media files. In response to a request for a media file, the CHIMPS 110 can utilize any number of application centers 112 and/or kernel application center(s) 111 to provide the client program with a data object concerning the requested media file. The data object can include information about the media file, including where the media file can be located, such as within the CDN 150 or within the CHIMPS 150 itself Location information may be provided by Universal Resource Indicator (URI), such as a Universal Resource Locator (URL) or other location indicator. During playback of the media file, the CHIMPS 150 can collect data regarding the playback through beaconing provided by a client program executed by the end user device 140 and/or an indexing service from within the CHIMPS and/or CDN. The CHIMPS 150 can subsequently provide the data and/or any analytics information derived from the data to the content provider 130.

Figure 2A:
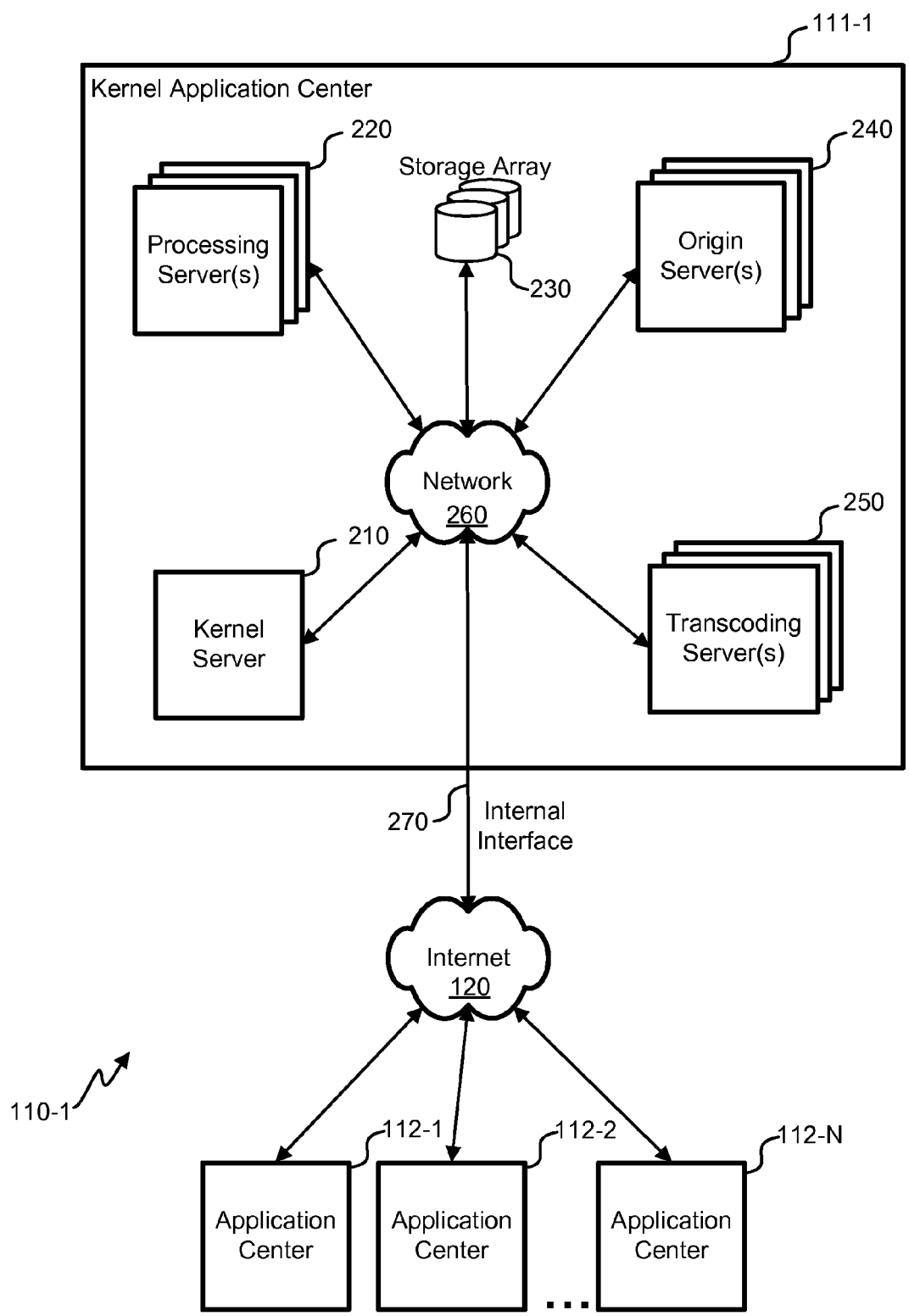
FIG. 2A is a block diagram of an embodiment of a kernel application center connected with application centers.

FIG. 2A is a block diagram illustrating an embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user device 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more origin servers 240 and a storage array 230 with which data objects and/or media files may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media files provided by a content provider 130 for syndication. Such a service can allow a content provider 130 to upload a media file to an application center 112, after which the application center 112 would notify the kernel server 210 that the media file has been uploaded. The kernel server can then notify services running on the processing server(s) 220 of the upload. These services can utilize transcoding server(s) to transcode the media file, which can then be moved to a CDN and/or stored locally by storage array 230 and origin server(s) 240. Services running on the processing server(s) 220 can also update the associated data object stored by the storage array 230 and origin server(s) 240.

Figure 2B:
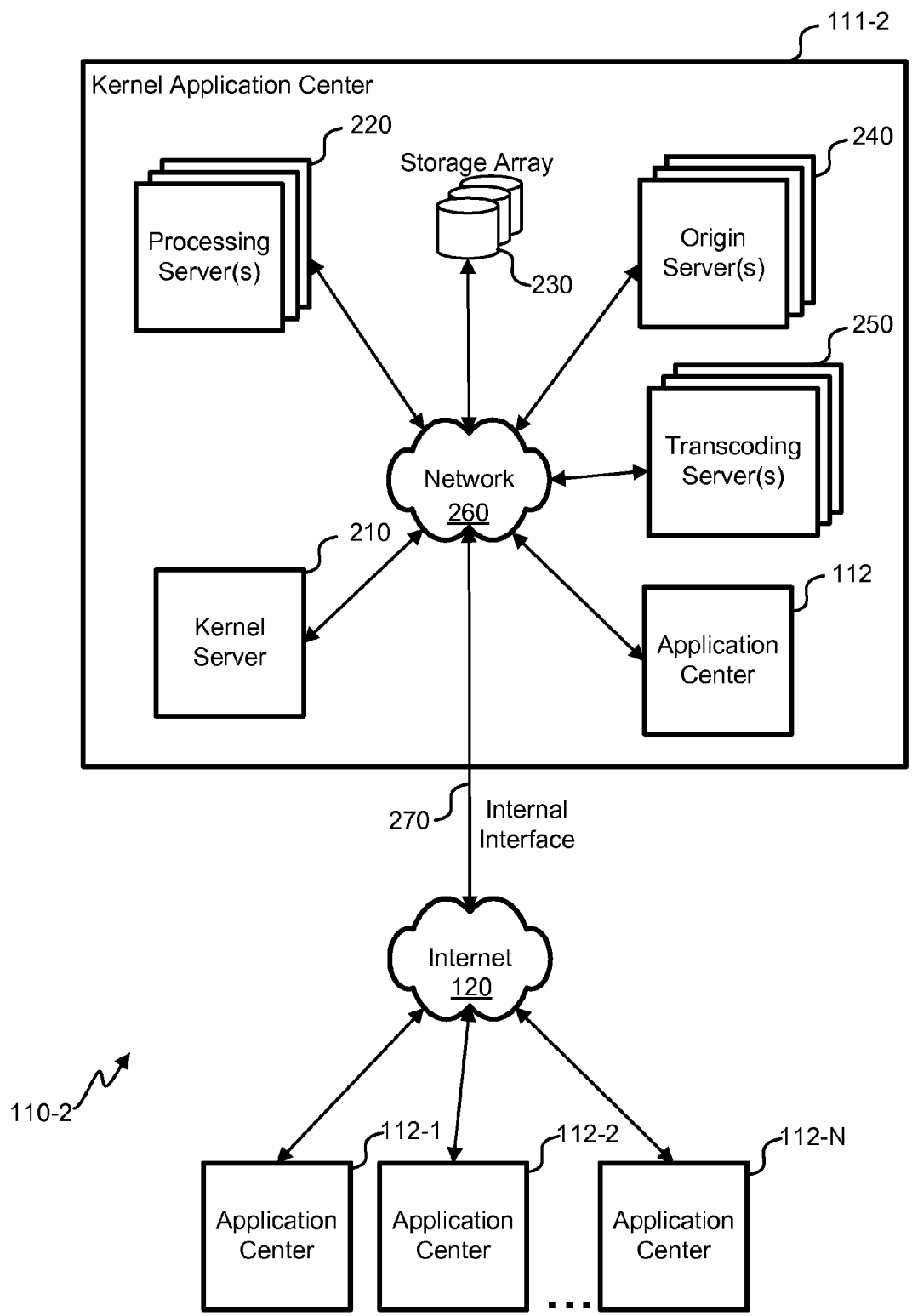
FIG. 2B is a block diagram of an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
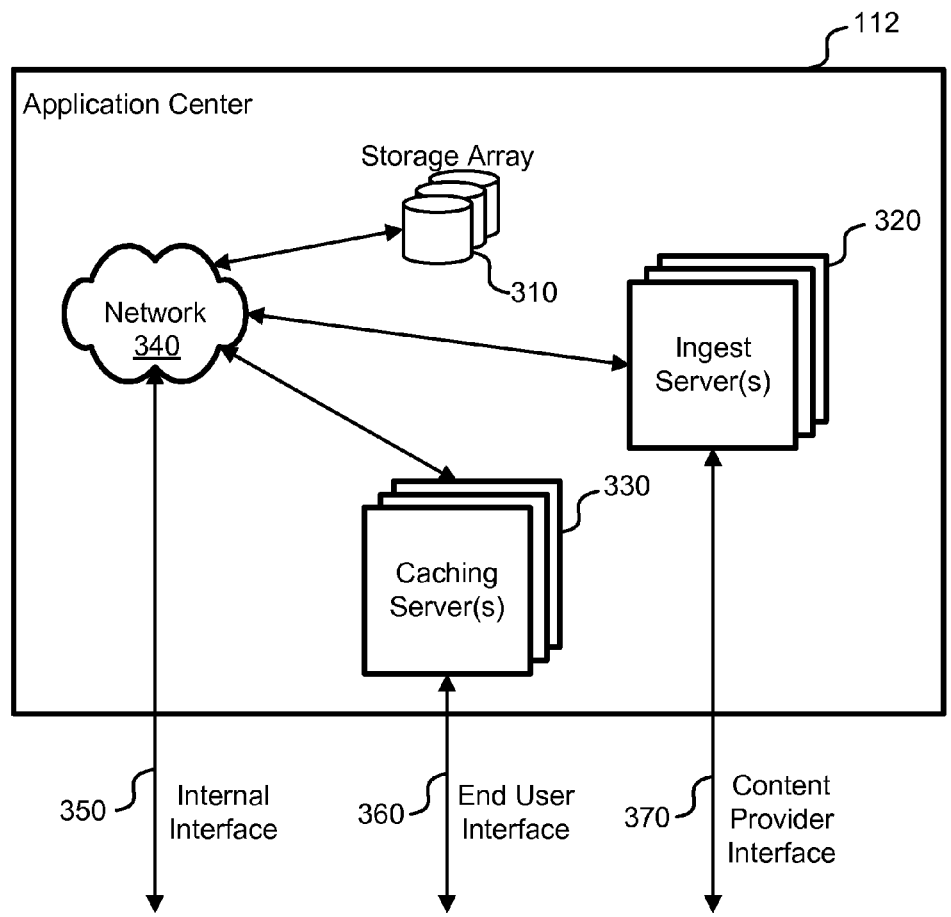
FIG. 3 is a block diagram of an embodiment of an application center.

FIG. 3 is a block diagram illustrating an embodiment of an application center 112. The application center 112 can include caching server(s) 330 and a storage array 310 for storing and distributing data objects of media files requested by end user devices through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media files from a content provider 130 through a content provider interface 370. The media files may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media files stored on storage array 310 can be made available to a kernel application center 111 for services such as transcoding.

Figure 4:
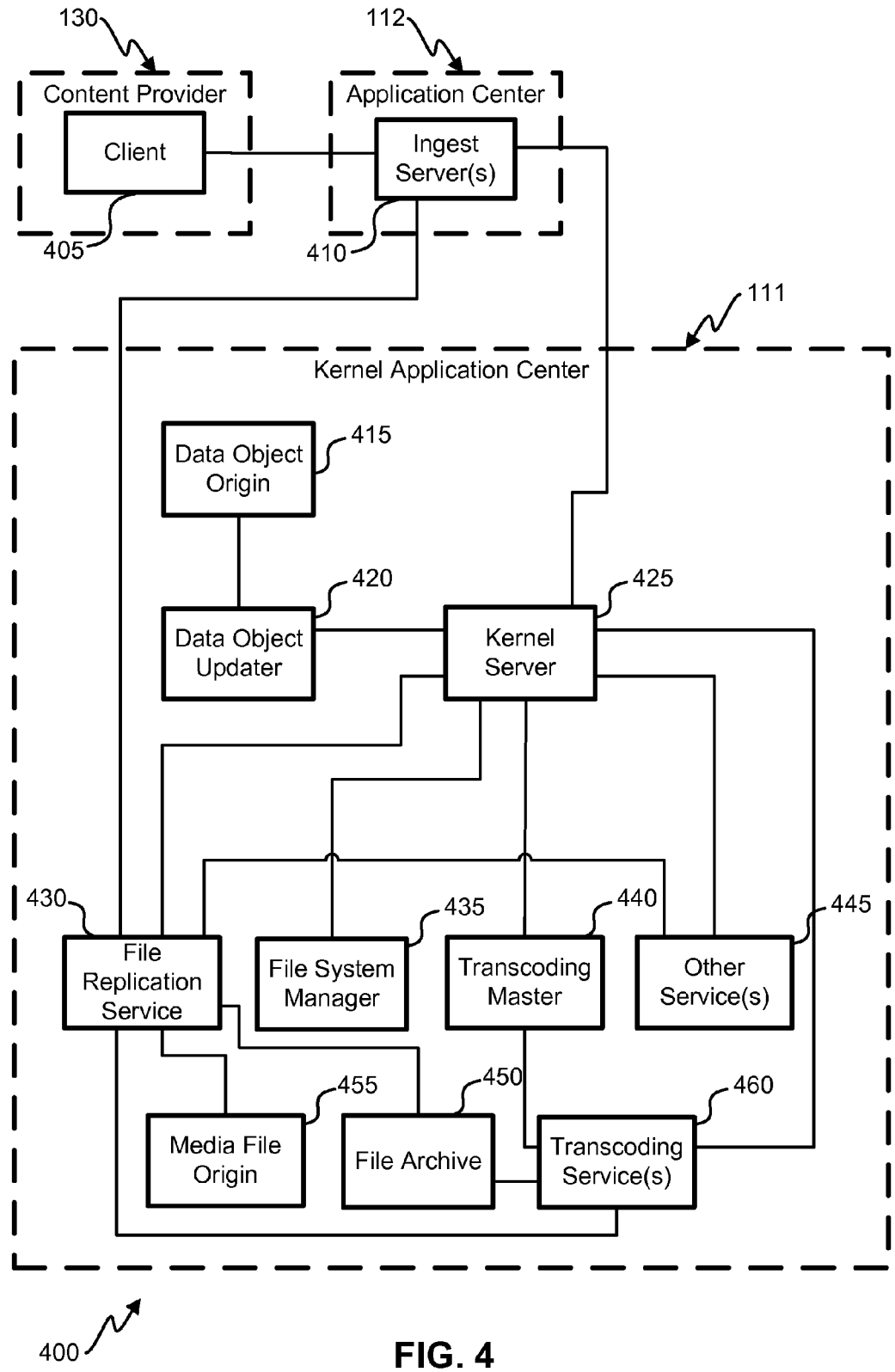
FIG. 4 is a block diagram of processes and objects utilized by a cloud-hosted integrated multi-node pipelining system for media ingestion, according to one embodiment.

FIG. 4 is a block diagram 400 of processes and objects utilized by the CHIMPS 110 for media ingestion, according to some embodiments. Although FIG. 4 further indicates the physical systems in which my execute or store these processes and objects, the processes and objects disclosed may be executed or stored on more than one system, including systems not disclosed in FIG. 4. In other words, the processes and objects shown in FIG. 4 allow for a variety of implementations through one or more of hardware, software, firmware, microcode, etc.

Media can be ingested into the CHIMPS 110 when a content provider 130 uploads a media file to ingestion server(s) 410 in an application center 112 by utilizing a client 405. The client 405 can be a stand-alone application or browser based, for example, and can communicate with ingest server(s) 410 through an application programming interface (API) configured for the ingestion of media files.

Ingest server(s) 410 can communicate with devices in the kernel application center 111 executing programs such as kernel server 425 and file replication service 430. The kernel server 425 can be configured organize the workflow among services such as transcoding 440 file system manager 435, and other services 445 (e.g., analytics, dynamic API, etc.) Upon a particular event, for example, the kernel server 425 can be configured to notify the relevant services of the event, causing the services to process tasks associated with the event.

The file replication service 430, under direction of the kernel server 425, can coordinate the movement of the media files between services. For example, retrieving the uploaded media file from the ingest server(s) 410 and storing it on the file archive 450, or retrieving transcoded media files from transcoding server(s) 460 and storing them in the media file origin 455.

The data object updater 420 keeps the data object origin 415 up to date in response to any changes in the system.

When, for example, a file is uploaded, transcoded, and stored in media file origin 455, the location and other metadata concerning the transcoded media files need to be created or updated in the data object origin 415 to ensure an end user device that accesses the object in the data object origin 415 has the correct information regarding the related media file. Because the data object updater 420 receives updates from the kernel server 425 (which is notified when a transcoded media file is stored in the media file origin 455, the system ensures the data objects in the data object origin 415 are constantly up to date.

The upload of a media file to the ingest server(s) 410, as described above, can provide an example of how the kernel server 425 may coordinate workflow. For instance, in response to the upload, the ingest server(s) 410 can notify the kernel server 425 that a media file has been uploaded. The kernel server 425 informs the file replication service 430 of the uploaded media file, and the file replication service 430 moves the uploaded media file into the file archive 450 and notifies the kernel server 425 of the move. In response, the kernel server 425 notifies the file replication service 430, the file system manager 435, and the transcoding master 440 of the move. The file replication service 430 then will know it can delete the uploaded media file from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media file from the file archive 450 to create transcoded media files. The transcoding service(s) 460 notify the kernel server 425 once transcoding is complete, and the kernel server 425 relays this information to the file replication service 430. The file replication service 425 then takes the transcoded media files from the transcoding services 460 and moves them to the media file origin 455. Once the file replication service 430 notifies the kernel server 425 of the move, the kernel server 425, in turn, notifies the file replication service 430 and the data object updater 420. The data object updater 420 which updates the data object origin 415 accordingly, and the file replication service 430 deletes the transcoded media files from the transcoding services 460.

The modular nature of the system enables all tasks associated with an event to be completed quickly. As illustrated in the example above, workflow relating to a particular event, such as a media file upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased. For example, a server of the CHIMPS 110 can be configured to dynamically switch its purpose based on external conditions such as load and overall system performance, providing functions such as transcode, upload, metrics collection, application web service, and more, on an as-needed basis.

Embodiments of the systems described above may include other components that manage various requests from end users and/or CDNs. For example, referring to FIG. 5A, an embodiment 500-1 of a system for dynamic on-the-fly advertisement insertion and other file manipulation is shown. Media may be downloaded and/or streamed to an end user device 140 though a client 510. As mentioned above, the client 510 can be stand-alone media player, a plug-in, a browser, or other application, which can be executed on a personal computer or other electronic device.

The process for dynamic index on-the-fly advertisement insertion begins when the client 510 requests a media file from a permutation index generator 530. The permutation index generator 530 can be a program instantiated for media streaming to a particular client 510. The permutation index generator 530 can be executed on a server or other computing device within an application center 112 of the CHIMPS 110. Additionally or alternatively, the permutation index generator 530 can be run by and/or connected with, a service (e.g., an advertisement service provider) external to the CHIMPS 110.

After receiving the request from the client 510, the permutation index generator 530 generates a permutation index. The permutation index can include a wide variety of information indicating a particular permutation of the requested media file, such as a primary media file (e.g., typically the requested media file), one or more secondary media files (e.g., advertisements), one or more insertion points (i.e., locations of the primary media file at which the secondary media file is to be inserted), and/or other information related to the manipulation of the primary media file. The permutation index can include a unique hash value that includes the information necessary to create the particular permutation, and it can be provided to the client 510 in the form of a URI or other location indicator.

The URI can then direct the client 510 to a CDN 150. The CDN 150 can use the permutation index of the URI to determine whether the particular permutation is stored in a local media file cache 520. If it is, then the CDN 150 can provide the particular permutation to the client 510 for download. If it is not, the CDN 150 can send a request to the Dynamic Permutation Layer (DPL) 540. The request can include the permutation index or it can be another indicator of the particular permutation.

The DPL 540, which be executed at a kernel application center 111 (or other system of the CHIMPS 110, such as an application center 112), can use the request received from the CDN to create the particular permutation. After receiving the permutation index (or other indicator of the particular permutation of the requested primary media file) from the CDN 150, the DPL 540 can retrieve the primary media file and/or secondary media file(s) from a media file origin 455. The media file origin 455 can be located within the kernel application center 111 as shown, or at another location internal or external to the CHIMPS 110. Alternatively, the primary media file and/or secondary media file(s) can be retrieved from multiple sources. For example, multiple media file origins may store the required files, each of which can be located within the kernel application center 111 or located elsewhere, internal or external to the CHIMPS 110. Once the pertinent files are retrieved, the DPL 540 can perform the necessary manipulations to create the particular permutation, and provide the CDN 150, which can store the particular permutation in the media file cache 520 and provide the particular permutation to the client 510.

Figure 5A:
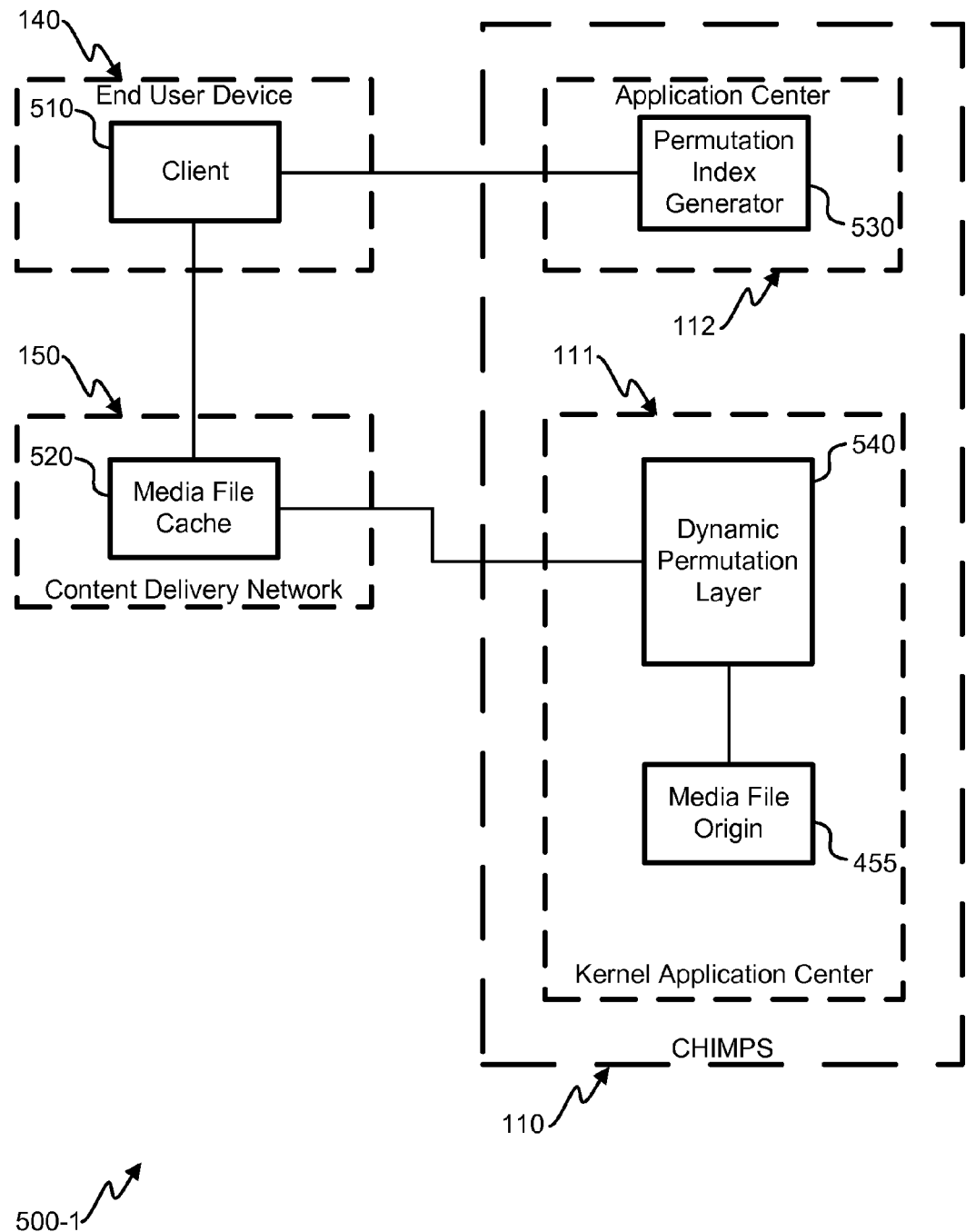
FIG. 5A is a block diagram of an embodiment of a system configured to provide media file manipulation for progressive downloading and/or other processes.
Figure 5B:
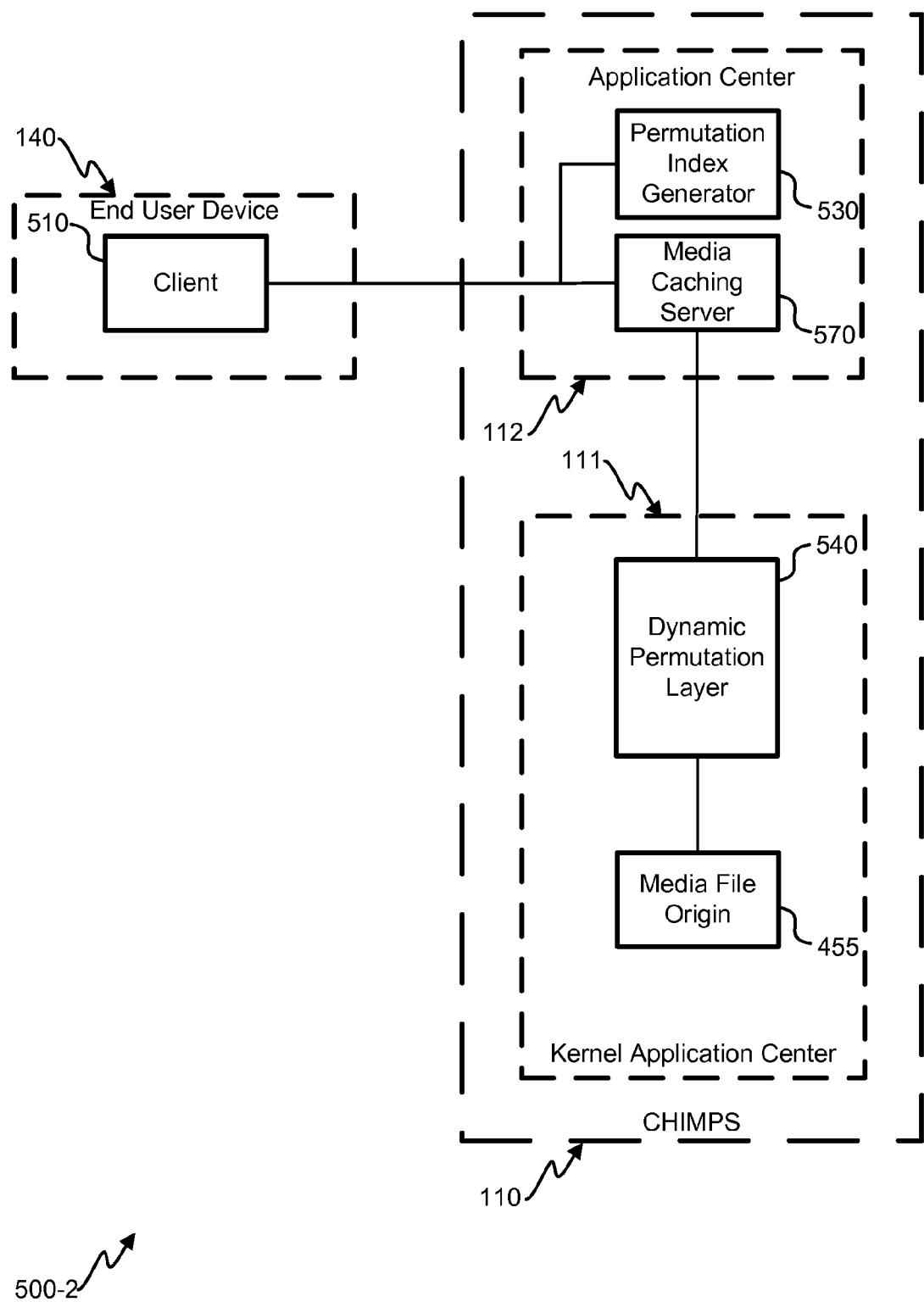
FIG. 5B is a block diagram of another embodiment of a system configured to provide media file manipulation for progressive downloading and/or other processes.

FIG. 5B illustrates an alternative embodiment 500-2 of a system for dynamic on-the-fly advertisement insertion and other file manipulation. Rather than utilize a CDN 150, this embodiment 500-2 includes a media caching server within an application center 112 of the CHIMPS 110. The media caching server 570 can receive a media file request from, and provide a corresponding permutation to, a client 510. Such a media caching server 570 can be one of several media caching servers 570 and/or can or similar device(s), which can be located anywhere within the CHIMPS 110 and/or in one or more systems communicatively linked to the CHIMPS 110.

Both embodiments 500-1, 500-2 of FIGS. 5A and 5B can be integrated with an advertisement service (not shown). For example, rather than the permutation index generator 530 determining a permutation of a requested media file, the permutation index generator 530 can notify the advertisement service of a requested media file. Additionally or alternatively, the permutation index generator 530 can provide other information, such as information relating to the client 510, the end-user device 140, and/or an end user. The advertisement service can then provide the permutation index generator 530 with information regarding advertisements and/or insertion points for a desired permutation. Additionally or alternatively, the advertisement service can provide information relating to desired permutations at scheduled or other times that may not necessarily correspond to a media file request from the client 510. Similar services can be used to provide permutation information to the permutation index generator 530 that does not relate to advertisements.

FIGS. 6A-6D are simplified block diagrams providing visual representations of the manipulations to a primary file (and, optionally, a secondary file) that can be performed using the techniques described herein. These media files, such as audio and video files, have content for playback over a period of time. As such, a secondary file can be inserted at a certain point within a primary file such that playback of the media of the secondary file occurs at a corresponding point during the temporal playback of the media of the primary file. As discussed hereinabove, to help ensure the resulting file does not encounter problems during playback, the manipulated files are converted to a transport stream format before manipulation.

Figure 6A:
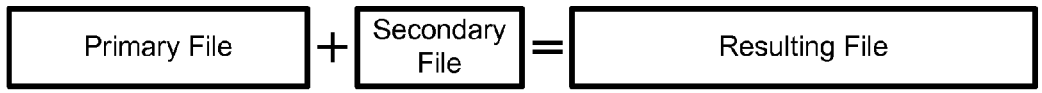
FIG. 6A is a diagram illustrating how two media files can be concatenated, according to methods detailed herein.
Figure 6B:
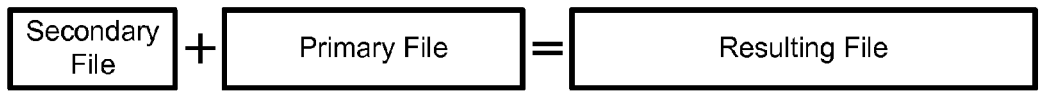
FIG. 6B is a diagram illustrating an alternate method of concatenating two media files.

FIG. 6A, for instance, illustrates a secondary file being inserted at the end of a primary file in order to create a resulting file. Thus, the resulting file, when converted back to a program stream format and played, plays the media of the primary file first, then the media of the secondary file. FIG. 6B illustrates a similar joining of primary and secondary files, but with the secondary file joined at the beginning of the primary file (therefore resulting in playback of the media of the secondary file before the media of the primary file).

Figure 6C:
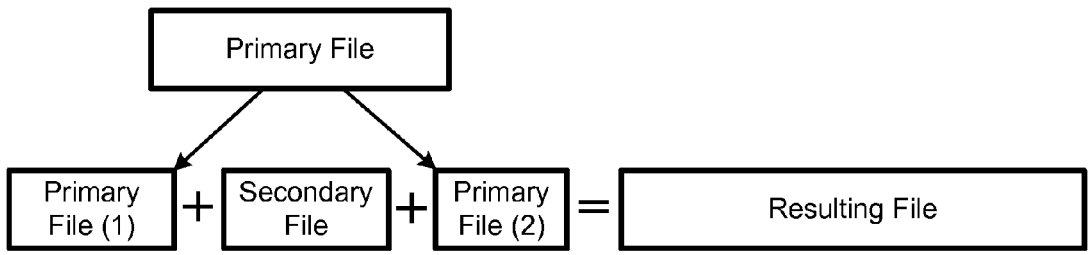
FIG. 6C is a diagram illustrating how one media file can be inserted into another, according to methods detailed herein.

FIG. 6C illustrates secondary file being inserted into a middle point of the primary file (i.e., a point other than the beginning or the end of the primary file). One way of executing the process in FIG. 6C is to perform three separate steps. First, the primary file can be split at a desired insertion point (corresponding to an point during the temporal playback of the media of the primary file). This creates a first portion (Primary File (1)) and a second portion (Primary File (2)) of the primary file. Second, similar to the process illustrated in FIG. 6A, the secondary file can be inserted at the end of the first portion of the primary file, creating an intermediate file (not shown). Third, the second portion of the primary file can be inserted at the end of the intermediate file to create the resulting file. Alternatively, after the primary file is split, the concatenation of the secondary file and both portions of the primary file may occur in one step.

Figure 6D:
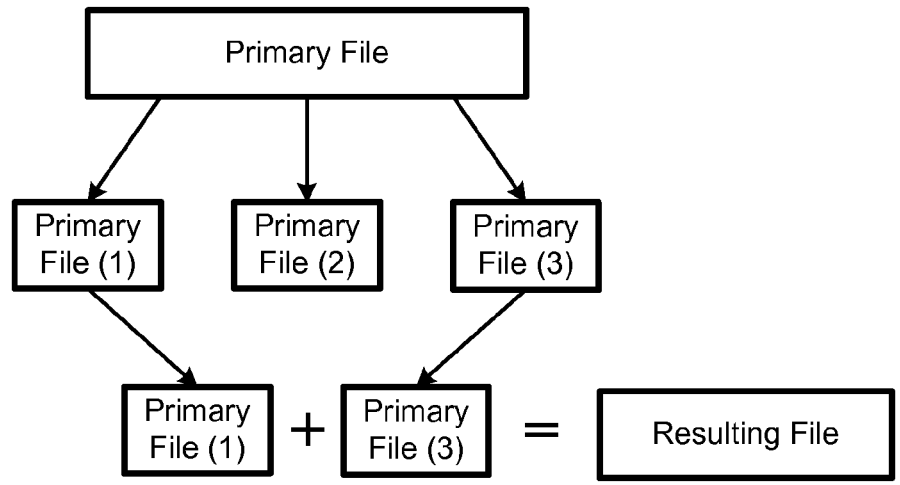
FIG. 6D is a diagram illustrating how a portion of a media file can be deleted, according to methods detailed herein.
Figure 6E:
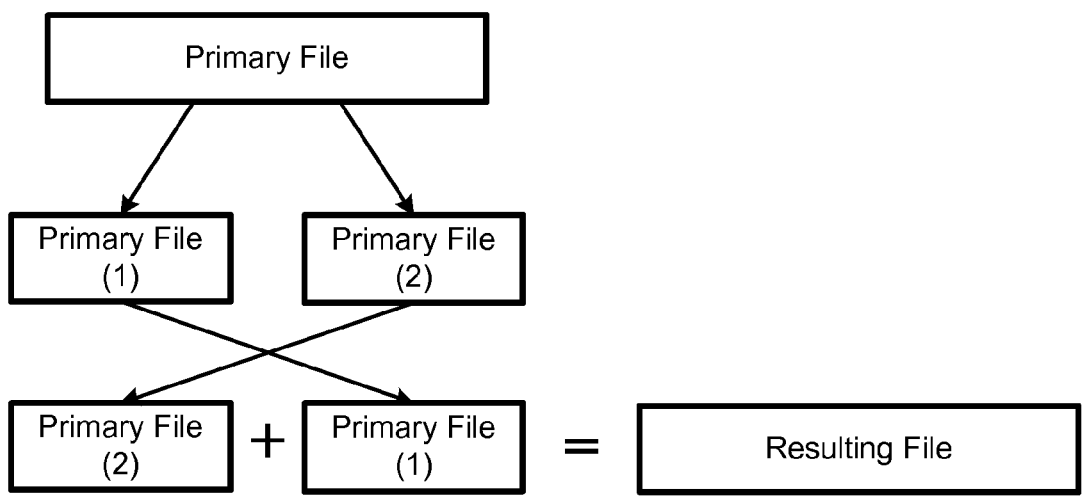
FIG. 6E is a diagram illustrating how portions of a media file can be rearranged, according to methods detailed herein.

FIGS. 6D and 6E illustrate manipulations to a primary file that do not use a secondary file. For example, FIG. 6D illustrates how a portion of the primary file can be deleted by splitting the primary file into first, second, and third portions (Primary File (1), Primary File (2) and Primary File (3), respectively), discarding the second portion, and joining the first and third portions to create the resulting file. FIG. 6E illustrates how portions of a primary file can be swapped by splitting the primary file into first and second portions (Primary File (1) and Primary File (2), respectively) and then inserting the first portion at the end of the second portion. The manipulation of a single media file (i.e., the primary file) can be used in situations where, for example, the media file of a television program is edited to create an advertisement of the television program, or the media file of a movie is edited to create a trailer for the movie.

The processes shown in FIGS. 6A-6E can be used in any combination to create any number of permutations of a requested media file. As a simple example, the resulting file of FIG. 6B, having a secondary file inserted at the beginning of a primary file, can be used as a primary file in the process of FIG. 6A. The resulting file would therefore contain a first secondary file, followed by the primary file, followed by a second secondary file (e.g., a video with commercials at the beginning and the end). First and second secondary files can be the same or different, depending on the desired permutation. Countless other combinations of the processes shown in FIGS. 6A-6E can be used to add, delete, and/or reorder portions of one or more media files to create a desired permutation.

As noted above, manipulations shown in FIGS. 6A-6E, when performed directly to media files in program stream format, often cause errors in the playback of the resulting file. For example, video file formats, such as MP4, comprise a program stream with a header and codec(s) (e.g., audio and/or video codec(s)). The program stream has timestamps at intervals throughout the file (e.g., keyframes) to help with synchronization and playback manipulation (e.g., fast forward/rewind). As such, media files typically cannot be joined and/or manipulated as discussed above without creating errors in the headers and/or timestamps of the resulting file. For example, if a secondary MP4 file is inserted at the end of a primary MP4 file, the header for the secondary MP4 file will be found somewhere in the middle of the resulting MP4 file, likely causing problems during playback of the resulting MP4 file. Additional steps, therefore, must be taken to help ensure the manipulations discussed in FIGS. 6A-6E do not result in such problems.

Figure 7A:
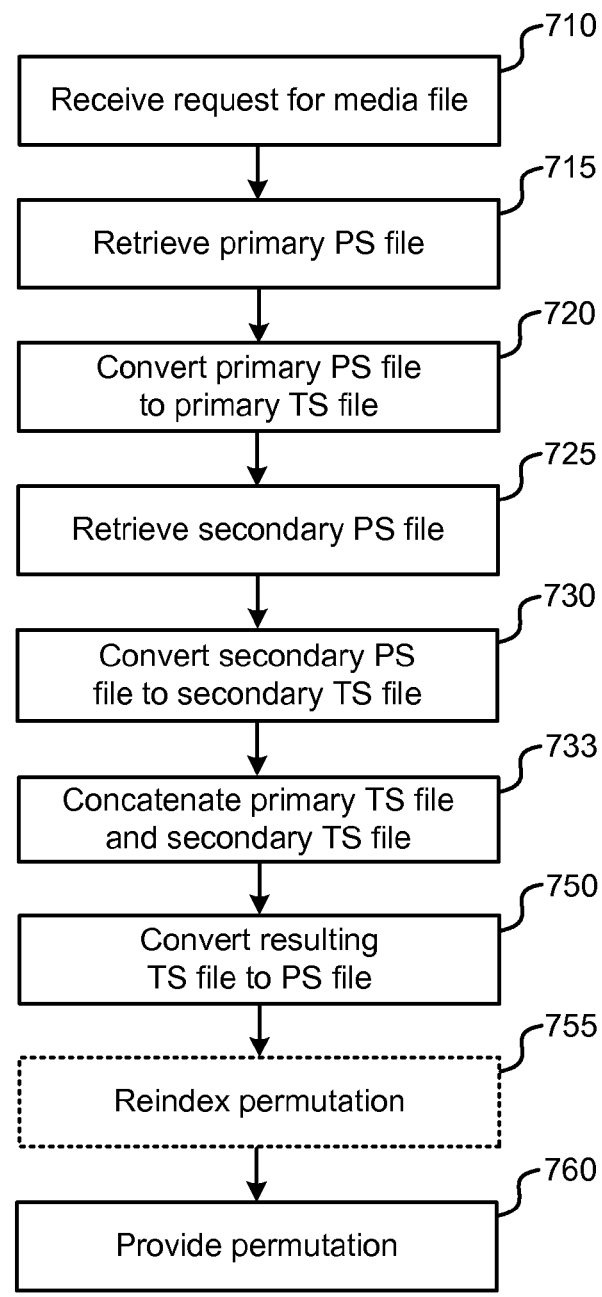
FIG. 7A is a flowchart of a method for dynamically manipulating a media file.

FIG. 7A is a flow diagram illustrating a process 700-1 by which media files can be manipulated while helping minimize or eliminate the playback problems discussed above. In addition to MP4 files, the process 700-1—and similar processes discussed herein—can apply to MPEG-2 Audio Layer 3 (MP3) files, Third Generation Partnership Project (3GP), and other files conforming to MPEG-2 (or later) program stream standards. The blocks shown in process 700-1 are provided as an example only, and are not limiting. Other embodiments can include more, less, combined, and/or rearranged blocks, depending on desired functionality.

At block 710, a request for a media file is received. As discussed herein the request can be received from a client 510 and/or a CDN 150. Moreover, depending on the source of the request and the desired functionality of the system, the request can be in the form of a URI (e.g., a URL). The request further may comprise, or result in the creation of, a permutation index, which can be provided by a permutation index generator 530.

At block 715, a primary file in program stream (PS) format (hereinafter "primary PS file") is retrieved, and at block 720, converted to a primary file in transport stream format (hereinafter "primary TS file" or "primary transport stream"). A primary PS file can be, for example, a media file requested from a client 510 and/or desired by an end user, in a program stream format. However, the terms "primary file," "secondary file," and similar terms used throughout this description, are used for referential purposes only and are not necessarily indicative of content. A primary file for purposes of one manipulation, for example, could be a secondary file for purposes of another, and vice versa. Blocks 725 and 730 indicate the retrieval and conversion of a secondary PS file to a secondary TS file, respectively. Blocks 715-730 can be rearranged in various ways without impacting the overall functionality of the process 700-1 (e.g., both PS files are retrieved then converted, the secondary PS file is retrieved first, etc.).

The conversion of a PS file into a TS file, can be done in a single step. As discussed above, a PS file can be a media file comprising a program stream having audio and/or video compression format(s). Various computer software tools and other programs, such as the open source project FFmpeg, enable "wrapping" the PS file to form a TS file. As discussed earlier, "wrapping" the PS file is a quick and simple process involving associating the media file with metadata to create a new file in TS format. Thus, a computer system can convert primary and secondary PS files to TS files, on the fly, using commands in a software program.

Once in the PS files are converted to TS files, the TS files can be manipulated, as shown in FIGS. 6A-6E. For example, the process 700-1, at block 733, provides concatenating primary TS file and secondary TS file in a process as shown in FIG. 6A or 6B. Each TS file (or TS file portion, as the case may be) can be viewed as a byte array. The concatenation therefore can be a simple binary concatenation of byte arrays, which can be performed by various computer software tools, programming languages, etc. The resulting file is a TS file that has metadata from both primary file TS and secondary file TS.

At block 750, the resulting TS file is converted to a program stream. As with conversion of a PS file to a TS file, the conversion from TS file to PS file can be performed, on the fly, using various computer software programs, such as FFmpeg. This conversion process alleviates many issues in the resulting program stream, due to concatenation, by rewriting the associated header.

Although timestamps may not be consistent in the resulting file, the resulting file may be provided as a progressive download at that point. Inconsistencies of timestamps in the resulting file can arise from the concatenation of the primary TS file and the secondary TS file, which may not be corrected during conversion of the resulting TS file to PS file (in other words, the headers may be rewritten, but not the timestamps). However, formats such as MP4 can tolerate these inconsistent timestamps, although it may prevent the resulting PS file from being suitable for streaming.

If timestamp correction of the resulting PS file is desired, the resulting PS file can be reindexed, at block 755. Reindexing files, or rewriting timestamps, can be performed by various software tools. MP4 files, for example, can be reindexed using the open source multimedia repackager MP4box. Furthermore, the reindexing can be performed quickly enough to enable the process 700-1 to be performed on the fly. Once the resulting PS file is reindexed, it can be suitable not only for progressive downloads, but streaming and/or other uses.

At block 760, the resulting PS file is provided. As discussed herein, depending on the functionality of the system, providing the resulting PS file can include providing the resulting PS file to a CDN 150 and/or client 510. Additionally or alternatively, the resulting PS file may be provided to another component of the CHIMPS 5B, such as to a media caching server 570 of an application center 112.

Figure 7B:
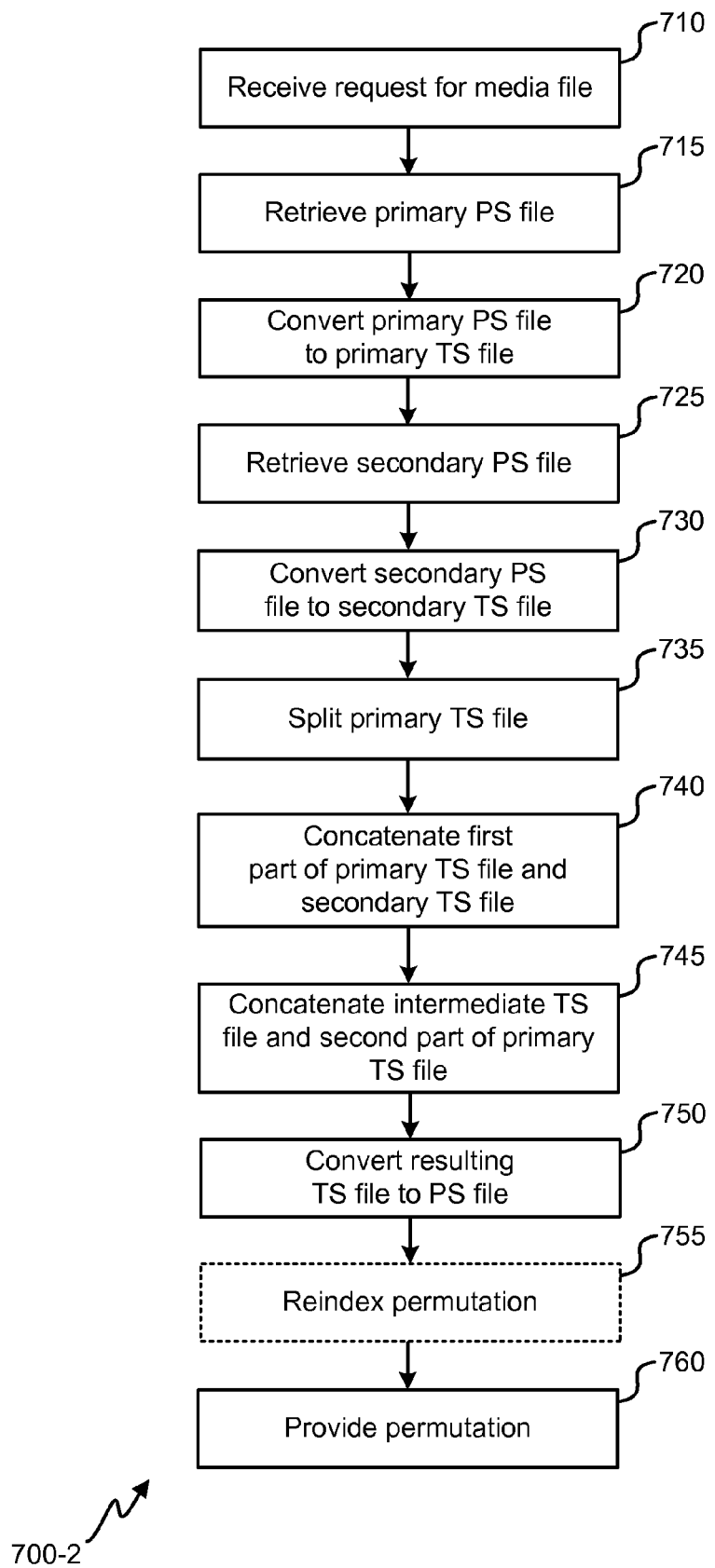
FIG. 7B is a flowchart of an alternative method for dynamically manipulating a media file.

FIG. 7B is a flow diagram illustrating another process 700-2 for media file manipulation. Similar to the process 700-1 of FIG. 7A, at blocks 710-730, the process 700-2 includes receiving a request and retrieving and converting primary and secondary PS files. However, at block 735, the process 700-2 also includes splitting the primary TS file in a process similar to the one described in FIG. 6C.

Similar to concatenation, splitting of a primary TS file can simply involve binary manipulation of the primary TS file. The location at which the primary TS file can be split can be indicated by a timestamp, which are indexed by a byte position. A system can therefore receive and/or generate a desired temporal location, in the playback of media of the primary PS file, at which media from the secondary PS file is to be inserted. The by locating the timestamp (or nearest timestamp) of the primary TS file corresponding to the desired temporal location, a computer can then determine the corresponding byte position of the timestamp and perform a binary split of the primary TS file at the byte position.

The process continues at block 740, where the first part of the primary TS file and the secondary TS file are concatenated to form an intermediate TS file. At block 745, the intermediate TS file and the second part of the primary TS file are concatenated. The remaining blocks, 750-755, echo those of the process 700-1 of FIG. 7A, in which the resulting TS file is converted back to a PS file, which is (optionally) reindexed, then provided to the appropriate entity.

The processes 700 of FIGS. 7A and 7B, and similar processes, can be altered to include various combinations of manipulations. For example, if a TS file is created from concatenating or otherwise joining a primary and secondary TS files, the resulting TS file can be further subject to manipulations—such as the concatenation of yet another TS file or a split and/or deletion of the TS file—before it is converted back to a PS file. Additionally or alternatively, a resulting TS file can be converted to a PS file and/or reindexed, before being converted back to a TS file for additional manipulations. Numerous variations to the processes 700 are contemplated.

Figure 8:
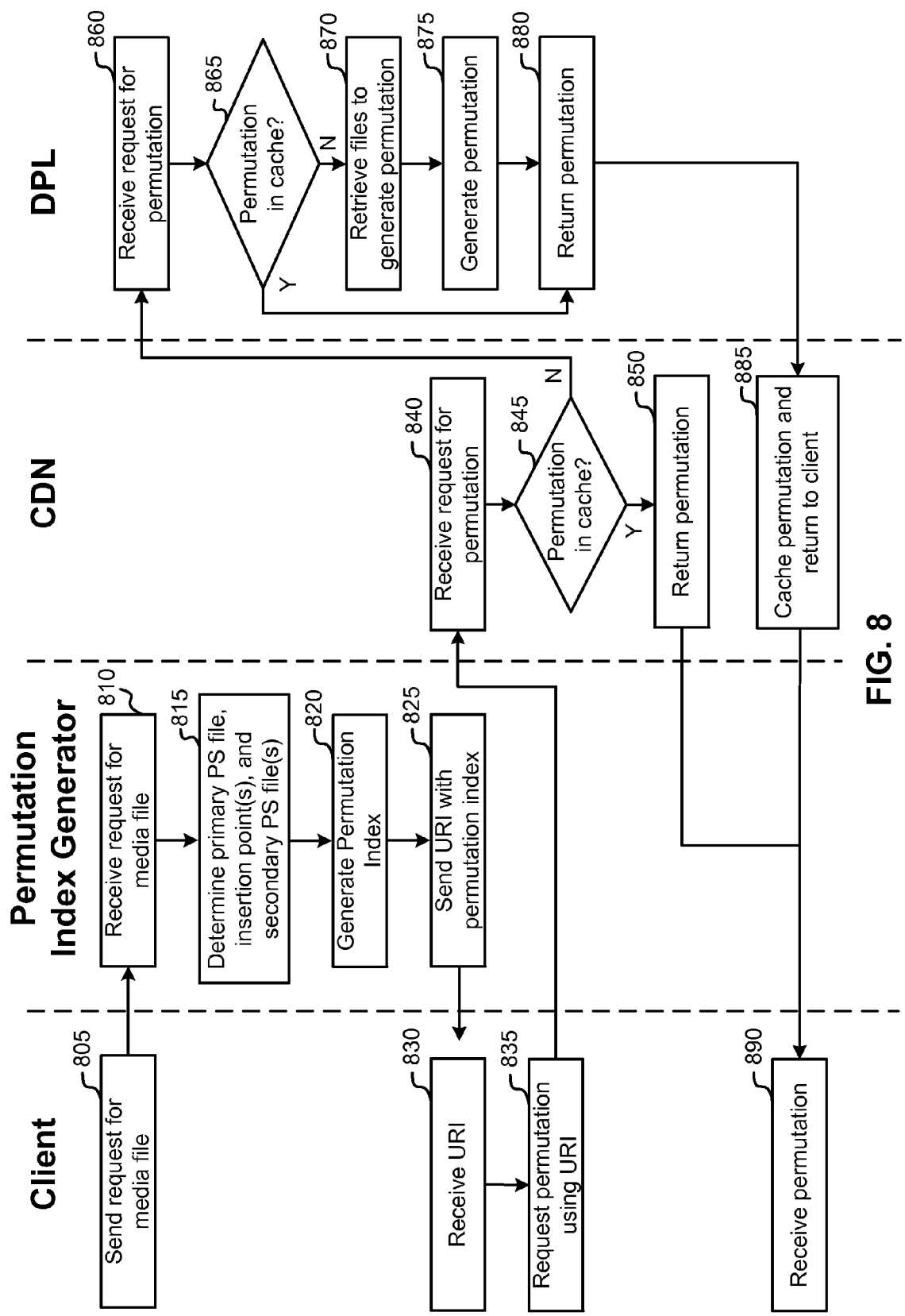
FIG. 8 is a simplified swim lane flowchart describing the interaction of components in a system configured to provide dynamic file manipulation, such as advertisement insertion into media files, according to one embodiment.

FIG. 8 is a swim-lane diagram demonstrating the interaction of various components to that can be used in transcodeless on-the-fly advertisement insertion (or other file manipulation), according to this disclosure. As with other figures, the blocks and components shown in FIG. 8 are provided as an example only, and are not limiting. Other embodiments can include more, less, combined, and/or rearranged blocks, depending on desired functionality. Moreover components may be combined, split, and/or altered to perform the functionality disclosed herein.

At block 805, a client 510 sends a request for a media file, which is received by a permutation index generator 530 at block 810. For example, in a URI request, the client 510 can convey information about a requested media file. Other information, such as user input, a desired advertisement and/or other permutation of the requested media file, etc., can also be included in a request.

At block 815, the permutation index generator 530 determines a primary PS file, insertion point(s), and secondary PS file(s). Where no secondary PS file(s) are used, the permutation index generator 530 does not determine insertion point(s) and secondary PS file(s). On the other hand, where secondary PS file(s) are used, ordering of the primary and/or secondary file(s) also can be determined and included in a permutation index.

At block 820, the permutation index generator 530 generates a permutation index describing a particular permutation of the requested media file. As discussed earlier, the permutation index can include the information determined by the permutation index generator 530 such as the identity of the primary PS file, the identity of any secondary PS file(s), insertion data indicating insertion point(s), and ordering of files. At block 825, the permutation index be included in a URI as a unique hash value, which is received by the client 510 at block 830 as a redirect, for example.

At block 835, the client 510 uses the URI to request the particular permutation from the CDN 150, which receives the request at block 840. At block 845, the CDN 150 determines whether the requested permutation is in a local cache 520 of the CDN 150. If so (which can indicate the permutation has been requested and created earlier), the permutation is provided by the CDN 150 at block 850, and received by the client 510 at block 890. On the other hand, if the CDN 150 determines the requested permutation is not in the local cache 520 of the CDN 150, the CDN 150 can request the permutation from the DPL 540.

After receiving the request for the permutation at block 860, the DPL 540 can determine whether the requested permutation is in its own cache. Such a cache can, for example, store permutations of media files requested from other sources. If the requested permutation is in the cache of the DPL 540, the DPL 840, at block 880, returns the requested permutation to the CDN 150. Otherwise, at block 870, the DPL 540 retrieves the files necessary to generate the permutation, and generates the permutation at block 875. Once the requested permutation is provided to the CDN 150, the CDN 150 caches the permutation and returns it to the client 510, at block 885.

An alternative embodiment (not shown) to the one depicted in FIG. 8 can include use of a dynamic advertisement proxy service. For example, in addition or as an alternative to the permutation index generator 530, the dynamic advertisement proxy service can be used to determine whether a requested media file is subject to advertisement rules. If so, the service can determine which advertisements to use and/or where to put them. The dynamic advertisement proxy service can run on the system on which the DPL 540 runs, and/or another system external or internal to the CHIMPS 110. Similar services can be utilized to determine the insertion of media other than advertisements.

As indicated herein, the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer- and/or machine-readable storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing media with a data network, the method comprising:
   receiving a media file request;
   retrieving a first media file, wherein:
      the first media file comprises media content for playback over a period of time, and
      the first media file has a program stream format;
   associating the first media file with a first set of metadata to create a first transport stream without transcoding the first media file;
   retrieving a second media file having the program stream format;
   associating the second media file with a second set of metadata to create to a second transport stream without transcoding the second media file;
   joining the first transport stream and the second transport stream to create a third transport stream, the third transport stream having a third set of metadata;
   removing at least a portion of the third set of metadata from the third transport stream to create a third media file in the program stream format; and
   providing the third media file.

2. The method for providing the media with the data network as recited in claim 1, further comprising splitting the first transport stream into two portions, wherein:
   each of the two portions of the first transport stream corresponds to a separate portion of the first media file;
   the joining the first transport stream and the second transport stream comprises inserting the second transport stream between the two portions of the first transport stream.

3. The method for providing the media with the data network as recited in claim 2, wherein the inserting the second transport stream between the two portions of the first transport stream comprises:
   concatenating the second transport stream to the end of a first portion of the first transport stream to form an intermediate transport stream; and
   concatenating a second portion of the first transport stream to the end of the intermediate transport stream.

4. The method for providing the media with the data network as recited in claim 1, further comprising reindexing the third media file.

5. The method for providing the media with the data network as recited in claim 1, wherein the program stream format comprises an audio compression format, a video compression format, or both.

6. The method for providing the media with the data network as recited in claim 1, further comprising providing a Universal Resource Indicator (URI) of the requested media file.

7. The method for providing the media with the data network as recited in claim 1, wherein the program stream format includes at least one format from the group consisting of:
MPEG-2 Audio Layer 3 (MP3),
Third Generation Partnership Project (3GP), and
MPEG-4 (MP4).

8. A system for communicating media over a network, the system comprising:
a data storage configured to store a first media file, having content for playback over a period of time, in a program stream format;
a processing server having a network interface and being communicatively coupled with the data storage, the processing server configured to:
receive, using the network interface, a media file request;
retrieve the first media file from the data storage;
associate the first media file with a first set of metadata to create a first transport stream without transcoding the first media file;
retrieve a second media file;
associate the second media file with a second set of metadata to create a second transport stream without transcoding the second media file;
join the first transport stream and the second transport stream to create a third transport stream, the third transport stream having a third set of metadata;
remove at least a portion of the third set of metadata from the third transport stream to create a third media file in the program stream format; and
provide, using the network interface, the third media file.

9. The system for communicating media over the network as recited in claim 8, wherein the processing server is configured to retrieve, using the network interface, the second media file from a source other than the data storage.

10. The system for communicating the media having content for playback over a period of time recited in claim 8, further comprising a media caching server having a memory and being communicatively coupled with the processing server, the media caching server configured to:
send the media file request, using a network, to the processing server;
receive the third media file, using the network, from the processing server; and
store the third media file in the memory.

11. The system for communicating media over the network as recited in claim 10, wherein the media caching server further is configured to provide the third media file to a device communicatively coupled with the media caching server.

12. The system for communicating media over the network as recited in claim 10, wherein:
the media file request comprises a first media file request for the third media file; and
the media caching server will not send a second media file request for the third media file to the processing server if the media caching server has the third media file stored in the memory.

13. The system for communicating media over the network as recited in claim 8, wherein the processing server further is configured to:
receive insertion data; and
join the first transport stream and the second transport stream based, at least in part, on the insertion data.

14. The system for communicating media over the network as recited in claim 13, wherein the processing server further is configured to determine, based on the insertion data, a point of the first media file at which content corresponding to the second media file is to be inserted.

15. The system for communicating media over the network as recited in claim 13, wherein joining the first transport stream and the second transport stream includes performing at least one action from the group of actions consisting of:
concatenating the second transport stream to the end of the first transport stream,
concatenating the first transport stream to the end of the second transport stream,
inserting the first transport stream into the second transport stream, and
inserting the second transport stream into the first transport stream.

16. A non-transitory, machine-readable storage medium for communicating a requested media file over a network, the storage medium having a plurality of instructions embedded thereon, which, when executed by one or more machines, cause the one or more machines to:
receive, using a network interface, instructions for manipulating a first media file to create the requested media file, wherein the requested media file includes content for playback over a period of time;
retrieve the first media file, the first media file having a program stream format;
associate the first media file with a first set of metadata to create a first transport stream without transcoding the first media file;
manipulate the first transport stream, using the instructions for manipulating the first media file, to create a manipulated transport stream;
create the requested media file, wherein:
creating the requested media file includes removing at least a portion of metadata of the manipulated transport stream, and
the requested media file has the program stream format; and
provide, using the network interface, the requested media file.

17. The non-transitory, machine-readable storage medium for communicating the requested media file over the network as recited in claim 16, wherein the plurality of instructions, when executed by the one or more machines, further cause the one or more machines to:
retrieve a second media file having the program stream format; and
associate the second media file with a second set of metadata to create a second transport stream without transcoding the second media file; wherein:
manipulating the first transport stream includes joining the first transport stream and the second transport stream to create the manipulated transport stream.

18. The non-transitory, machine-readable storage medium for communicating the requested media file over the network as recited in claim 17, wherein manipulating the first transport stream includes:
splitting the first transport stream into two portions such that each of the two portions of the first transport stream corresponds to a separate portion of the first media file; and inserting the second transport stream between the two portions of the first transport stream.

19. The non-transitory, machine-readable storage medium for communicating the requested media file over the network as recited in claim 18, wherein the instructions for manipulating the first media file include information indicative of an identity of the second media file.

20. The non-transitory, machine-readable storage medium for communicating the requested media file over the network as recited in claim 18, wherein the instructions for manipulating the first media file include information indicative of a point at which the first transport stream is to be split.

* * * * *